United States Patent
Oddsen, Jr.

(10) Patent No.: US 6,505,988 B1
(45) Date of Patent: Jan. 14, 2003

(54) TILTER FOR POSITIONING ELECTRONIC DEVICES

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 09/406,530

(22) Filed: Sep. 27, 1999

Related U.S. Application Data

(60) Provisional application No. 60/137,088, filed on Jun. 2, 1999.

(51) Int. Cl.$^7$ .................................................. E04G 3/00
(52) U.S. Cl. ..................... 403/110; 248/278.1; 248/918; 248/921; 403/84
(58) Field of Search ................ 248/278.1, 292.12, 248/918, 921, 922, 923; 403/83, 84, 86, 110

(56) References Cited

U.S. PATENT DOCUMENTS

| | | | |
|---|---|---|---|
| 3,131,900 A | 5/1964 | Anderson et al. ............ 248/210 |
| 3,424,419 A | 1/1969 | Siegel ........................ 248/226 |
| 3,489,383 A | 1/1970 | Anson ........................ 248/226 |
| 4,034,946 A | * 7/1977 | Zimmer, Jr. ......... 248/278.1 X |
| 4,470,106 A | * 9/1984 | Norton ................ 248/278.1 X |
| 4,687,167 A | 8/1987 | Skalka et al. ................ 248/282 |
| 4,703,909 A | 11/1987 | Dayton et al. ............ 248/280.1 |
| 4,821,159 A | 4/1989 | Pike ............................. 62/285 |
| 4,852,842 A | 8/1989 | O'Neill .................... 248/280.1 |
| 5,201,896 A | 4/1993 | Kruszewski ................ 248/278 |
| 5,584,596 A | 12/1996 | Greene ........................ 403/55 |
| 5,615,854 A | 4/1997 | Nomura et al. .......... 248/287.1 |
| 5,642,819 A | 7/1997 | Ronia ....................... 211/86.01 |
| 5,664,750 A | 9/1997 | Cohen .................... 248/231.71 |
| 5,743,503 A | 4/1998 | Voeller et al. ............ 248/284.1 |
| 5,765,794 A | 6/1998 | Chen ..................... 248/292.12 |
| 5,842,672 A | * 12/1998 | Sweere et al. ........... 248/278.1 |
| 5,941,493 A | 8/1999 | Cheng ........................ 248/371 |
| 6,076,785 A | 6/2000 | Oddsen, Jr. .............. 248/118.3 |

* cited by examiner

Primary Examiner—Lynne H. Browne
Assistant Examiner—John Cottingham
(74) Attorney, Agent, or Firm—Lerner, David, Littenberg, Krumholz & Mentlik, LLP

(57) ABSTRACT

A tilter for positioning electronic devices such as flat-screen monitors. The tilter includes a support block pivotally attached to a center tilt mount, and a shaft that is capable of engaging an extension arm or other components that attach to a support block. A rotating plate is rotatably secured to the center tilt mount. An adapter plate that is capable of securing the tilter to a variety of standardized fastening regions is secured to either the rotating plate or the center tilt mount. The tilter allows for the rotational positioning of an electronic device about one or more axis.

57 Claims, 7 Drawing Sheets

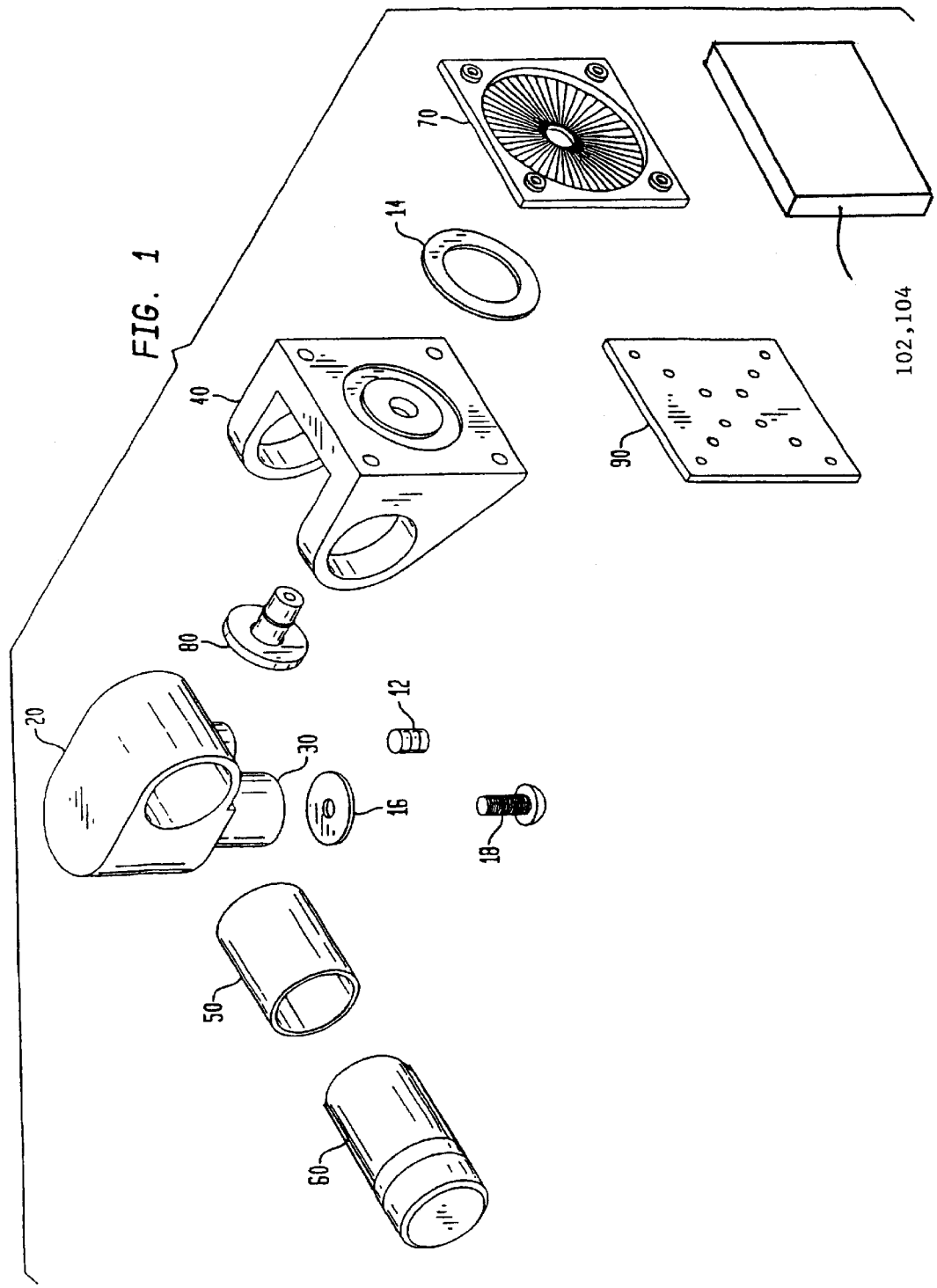

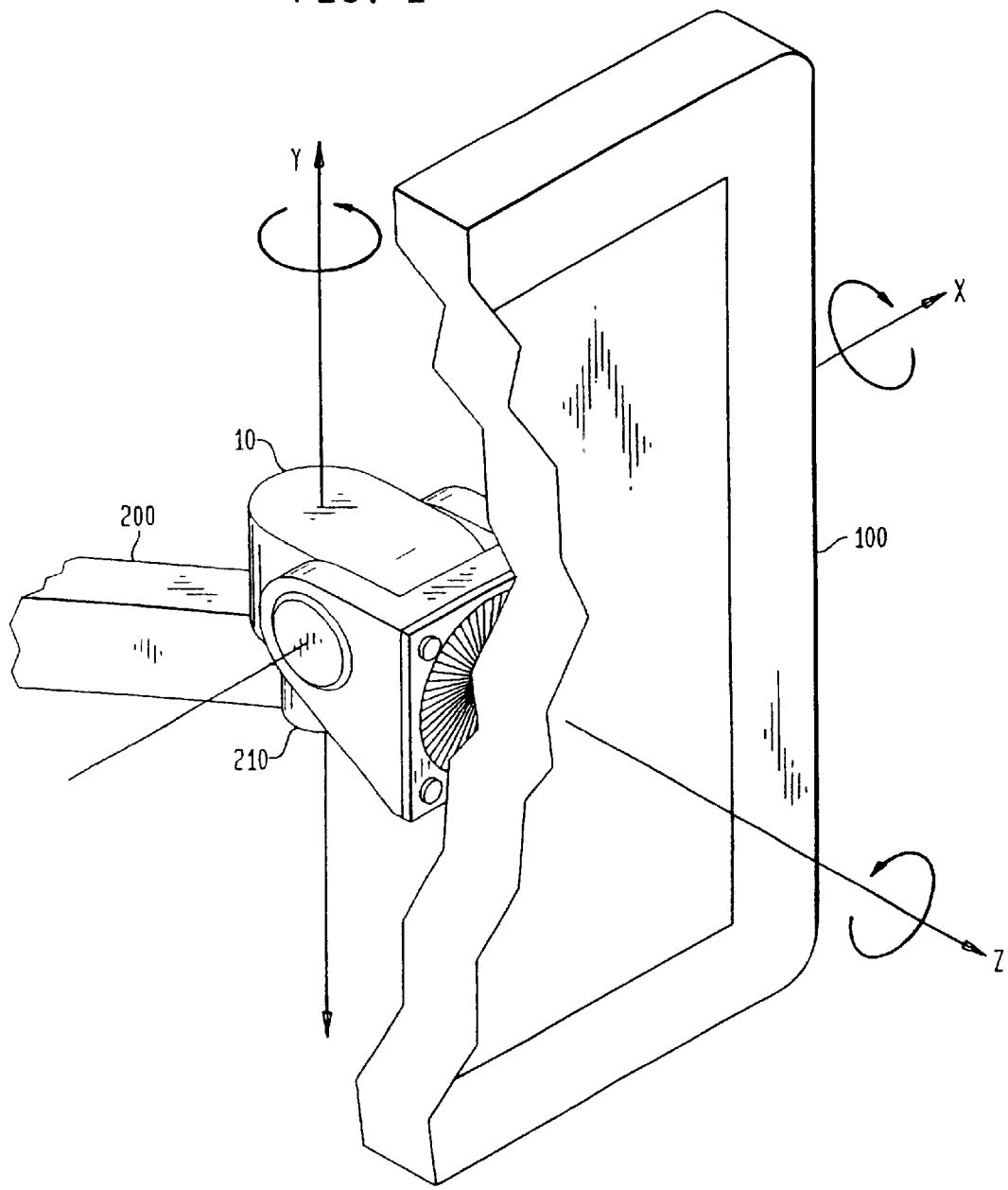

TILTER FOR POSITIONING ELECTRONIC DEVICES

This application claims priority under 35 U.S.C. §119(e) of a provisional application No. 60/137,088 filed on Jun. 2, 1999.

FIELD OF THE INVENTION

This invention relates generally to a tilter device for positioning electronic devices, and more particularly, to a tilter device suitable for adjustably positioning a flat-screen electronic peripheral device, such as a computer monitor or television.

BACKGROUND OF THE INVENTION

Mechanical extension arms or stands used to support electronic devices are known in the prior art. Such extension arms attach to computer monitors, for example, allowing a user to then mount the arm to a desk, wall, or other appropriate surface. The arm enables the user to linearly position the device along one or more axis. One such extension arm is shown and described in Applicant's co-pending patent application Ser. No. 60/133,378 filed on May 10, 1999 entitled "An Arm Apparatus for Mounting Electronic Devices", which is incorporated by reference herein as fully as if set-forth in its entirety.

In order that a device may be positioned with even greater precision, a tilter that allows a device to be rotated about one or more axis is typically employed. Tilters for various uses have been described in the prior art. For example, U.S. Pat. No. 4,047,684 to Kobayashi discloses an adjustable tilter device used for holding objects such as musical instruments. This tilter includes a stationary tilter block that attaches to a stand, along with a movable tilter block that detachably connects to the stationary tilter block. This tilter, however, is not suitable for use with electronic devices because it lacks the appropriate means to attach to such a device.

In the prior art, when an electronic device such as a computer monitor or a television were desired to be tiltable, the device was typically balanced on a horizontal platform that was attached to a tilter on its bottom face. The tilter either rested on a flat surface like a desk, in which case it required a wide base so as to prevent the device from tipping over when tilted, or else it was attached to an extension arm, in which case the tilter was required to made of heavy gauge material so as to accommodate the weight of the device.

However, the tilters of the prior art are not well suited for use with flat-screen devices, such as flat-screen computer monitors and televisions. For instance, one of the reasons that flat-screen devices are increasing in popularity is due the fact that they require a minimal amount of space. When a tilter is employed with a flat-screen device, the tilter should not significantly increase the space which is occupied by the device. However, the tilters of the prior art do not minimize the space occupied by the device because these tilters are typically bulky. Furthermore, the prior art tilter which employs a horizontal platform as previously described, cannot be used with a flat-screen device, because flat-screen devices cannot be balanced on a horizontal platform, since their depth is insufficient to keep the device from tipping over.

Another problem associated with the prior art tilters is how to attach a flat-screen device to a mounting surface. Regardless of the type of extension arm employed and regardless of whether a tilter is employed, a flat-screen device is typically mounted in position by bolts, screws or other fastening devices that engage holes located on the back of the device. The VESA is currently considering several standards for the spacing and positioning of the holes located on the back of the flat-screen device to be mounted. Until a particular VESA standard has been adopted, manufacturers of flat-screen mounting devices, such as tilters, run the risk of designing and fabricating mounting devices that will be incompatible with the standard eventually adopted.

Thus, there is a need for a tilter device that is suitable for mounting an electronic peripheral device, such as a flat-screen computer monitor or television, and that can accommodate various mounting standards.

SUMMARY OF THE INVENTION

It is a primary object of the present invention to provide an adjustable tilter device used for holding an object, such as an electronic peripheral, which enables a user to rotate the object at angles relative to one or more axis.

In accordance with one embodiment of the present invention, the tilter device is comprised of a center tilt mount pivotally attached to a support block, and a rotating adapter plate attached to the center tilt mount. The tilter device is attached to the electronic peripheral through the use of an adapter plate that can accommodate various mounting standards.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are not necessarily drawn to scale and are merely conceptual in nature and are designed solely for the purposes of illustration and not as a definition of the limits of the invention, for which reference should be made to the appended claims.

BRIEF DESCRIPTION OF THE DRAWINGS

The accompanying drawings, which are incorporated in and form a part of the specification, illustrate the embodiments of the present invention and, together with the description, serve to explain the principles of the invention.

FIG. 1 is an exploded view of a tilter according to one embodiment of the invention;

FIG. 2 is a perspective view of the tilter shown in FIG. 1 illustrating the various axis of rotation;

DETAILED DESCRIPTION OF PREFERRED EMBODIMENTS

Figure 3A:
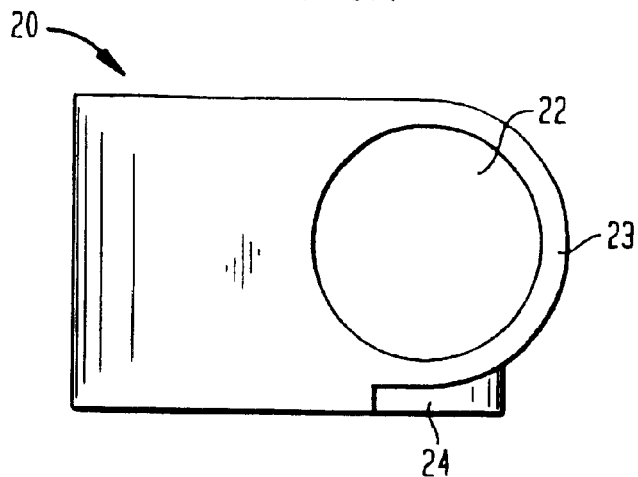
FIG. 3a is a side view of a support block according to one embodiment of the invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 9 in particular, the apparatus of the present invention is disclosed. The present invention, in accordance with one embodiment, relates to a tilter 10, illustrated in FIG. 1, capable of positioning a flat-screen electronic peripheral device 100 (FIG. 2), such as a computer monitor, at user defined angles in relation to all three dimensions. The tilter 10 is configured so that it may be used in conjunction with an extension arm 200 (a portion of which is illustrated in FIG. 2) which is described in patent application Ser. No. 60/133,378 filed on May 10, 1999 entitled "An Arm Apparatus for Mounting Electronic Devices", or a polestand (not shown) which is described in patent application Ser. No. 60/137,087 filed on Jun. 2, 1999 entitled "Polestand Apparatus for Mounting Electronic Devices".

FIG. 1 illustrates an exploded assembly drawing of the tilter 10, according to one embodiment of the invention. The tilter 10 includes a support block 20 attached to a support block shaft 30, and a center tilt mount 40 pivotally attached to the support block 20 by a support block bushing 50, a tilter roller shaft 60, and a set screw 12. If a rotating plate 70 is part of the configuration, it is attached to the center tilt mount 40 by, for example, a rivet 80. Preferably, before attaching the rotating plate 70 to the center tilt mount 40, a washer 14, such as a nylon washer, is disposed between the two. An adapter plate 90 is connected to the rotating plate 70 (if the rotating plate 70 is part of the tilter 10 configuration) or is connected directly to the center tilt mount 40 (if the rotating plate 70 is not part of the tilter 10 configuration) with, for example, threaded fasteners (not shown). The tilter 10 may be securely attached to an appropriate surface, such as an extension arm 200. The support block shaft 30 is located within a coupling 210 in the extension arm 200 and is secured within the coupling 210 by using, for example, a washer 16 and a screw 18, such as, a steel washer and a pan head screw. The tilter 10 may securely attach to a flat screen device 100 by connecting the flat screen device 100 to the adapter plate 90 via standardized fastening regions (Illustrated in FIGS. 9a–9c) disposed on both the adapter plate 90 and the flat-screen device 100.

FIG. 2 illustrates how the tilter 10 can be rotated around all three axis, i.e. the x-axis, the y-axis and the z-axis. The tilter 10 is rotated around the x-axis by rotating the center tilt mount 40 with respect to the support block 20 at the tilter roller shaft 60. The tilter 10 is rotated around the y-axis by rotating the support block shaft 30 within the coupling 210 of the extension arm 200. The tilter 10 is rotated around the z-axis by rotating the rotating plate 70 with respect to the center tilt mount 40 using the rivet 80. When using the tilter 10 in conjunction with the extension arm 200, the extension arm 200 allows for linear movement along the x, y, and z-axis and the tilter 10 allows for rotation about the same axis. The tilter 10 will freely rotate about the axis of the support block shaft 30, the axis of the rivet 80, and the axis of the tilter roller shaft 60 upon loosening the set screw 12.

Figure 3B:
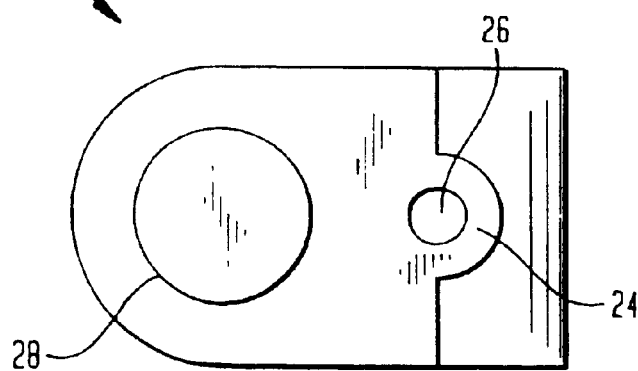
FIG. 3b is a bottom view of the support block shown in FIG. 3a according to one embodiment of the invention.

As illustrated in FIGS. 3a and 3b, the support block 20 is generally a cubical block which is cast from a relatively strong metal, such as zinc. The support block 20 has a bushing hole 22 formed therein. The support block 20 may have a sidewall 23 that is rounded so as to follow the shape of the bushing hole 22. This provides an equal amount of material supporting the outer edge of the bushing hole 22. If the support block 20 has the rounded sidewall 23, then the support block 20 will include a set screw boss 24. As illustrated in FIG. 3b, the set screw boss 24 provides material through which a tapped hole 26 is disposed. The tapped hole 26 communicates with a surface of the bushing hole 22. A shaft hole 28 is disposed in the support block 20. The shaft hole 28 nearly extends through the entire height of the support block 20 and is capable of receiving the support block shaft 30.

Figure 4A:
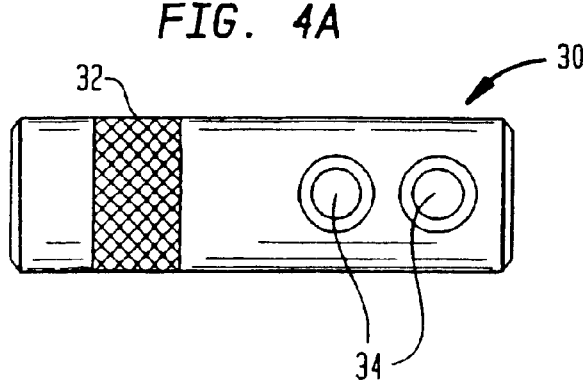
FIG. 4a is a side view of a support block shaft according to one embodiment of the invention.
Figure 4B:
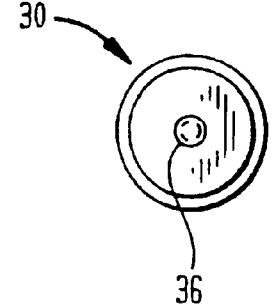
FIG. 4b is a bottom view of the support block shaft shown in FIG. 4a according to one embodiment of the invention.

FIG. 4b illustrates that the support block shaft 30 is generally cylindrically shaped. The support block shaft 30 is fabricated from a strong lightweight material, preferably aluminum because of its relative strength, lightness, and ability to efficiently transfer heat. As illustrated in FIG. 4a, a diamond knurl band 32 is disposed about the circumference of the support block shaft 30, at a point on the support block shaft 30 that is approximately one-third of the distance from a first end to a second end of the support block shaft 30. The diameters of the support block shaft 30 and the shaft hole 28 are nearly the same. Thus, upon inserting the support block shaft 30 into the shaft hole 28, the knurl band 32 allows for a secure press fit between the support block shaft 30 and the support block 20. The support block shaft 30 may contain threaded holes 34 in an outer perimeter thereof to provide additional flexibility for mounting. As illustrated in FIG. 4b, the support block shaft 30 includes a threaded hole 36 provided therein at an axial centerline of the support block shaft 30. The threaded hole 36 receives the screw 18 which is threaded through the washer 16 (shown in FIG. 1) for the purpose of securing the tilter 10 to the coupling 210 of an extension arm 200 or other device. The tilter device 10 rotates around the axis of the support block shaft 30 (shown as the y-axis in FIG. 2) which is perpendicular to the x-axis around which the center tilt mount 40 rotates relative to the support block 20 (as will be discussed further below).

Figure 5A:
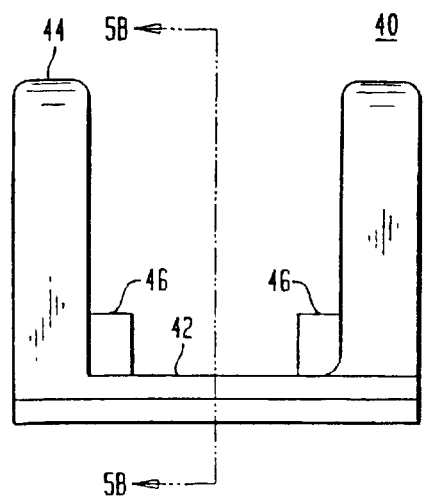
FIG. 5a is a front view of a center tilt mount according to one embodiment of the invention.
Figure 5B:
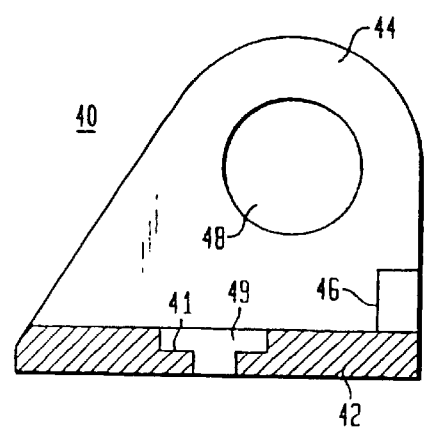
FIG. 5b is a sectional view along line A—A of the center tilt mount shown in FIG. 5a according to one embodiment of the invention.
Figure 5C:
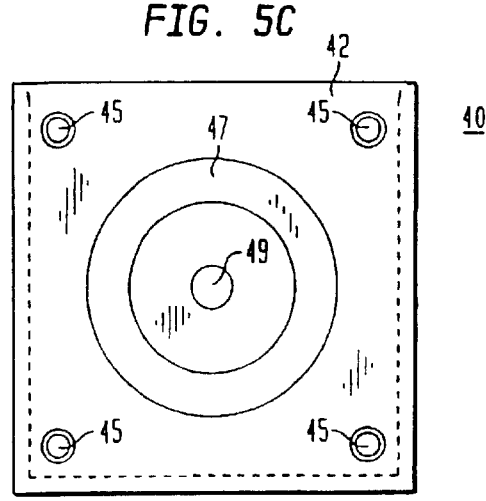
FIG. 5c is bottom view of the center tilt mount shown in FIG. 5a according to one embodiment of the invention.

With reference to FIGS. 5a–c, the center tilt mount 40 is cast from relatively lightweight, strong metal, such as aluminum. As shown in FIG. 5a, the center tilt mount 40 comprises a base 42 having a generally square shape, from which extend flanges 44. Stops 46, which are generally cubical shaped blocks, are formed on an inner surface of the base 42 adjacent to the flanges 44. The stops 46 serve to arrest the rotation of the center tilt mount 40 in the negative direction about the x-axis. As illustrated in FIG. 5b, the flanges 44 have shaft holes 48 formed therein for accepting the tilter roller shaft 60. The shaft holes 48 align with the bushing hole 22 so as to form an extended tubular passageway when the support block 20 is located between the flanges 44. A rivet hole 49 extends through the center of the base 42. The rivet hole 49 includes a recessed portion 41 upon which a head of the rivet 80 may securely fit.

FIG. 5c illustrates that the base 42 also includes a shallow washer channel 47, capable of receiving the washer 14. The shallow washer channel 47 preferably has a depth of approximately 0.016 inches. Additionally, mounting holes 45 are disposed near corners of the base 42 and extend into the flanges 44. As discussed in more detail below, the mounting holes 45 allow the tilter 10 to be secured directly to the adapter plate 90.

Figure 6:
FIG. 6 is a side view of a tilter roller shaft according to one embodiment of the invention.

FIG. 6 illustrates that the tilter roller shaft 60 is generally cylindrically shaped. As with the support block shaft 30, the tilter roller shaft 60 is preferably fabricated from aluminum. A straight knurl band 62 is disposed at one end of the tilter roller shaft 60. Preferably the width of the knurl band 62 corresponds to the width of the flanges 44. In order to pivotally attach the support block 20 and the center tilt mount 40, a support block bushing 50 (shown in FIG. 1) is first inserted into the bushing hole 22. The support block bushing 50 is fabricated from a smooth material, such as plastic, and preferably has flanges on each side. The support block bushing 50 provides a bearing surface upon which the tilter roller shaft 60 may rotate. Having the support block bushing 50 made of plastic provides a smooth surface which minimizes friction and avoids metal to metal contact between the support block 20 and the tilter roller shaft 60. Moreover, a portion of the support block bushing 50 that protrudes from the bushing hole 22 acts as a washer between the support block 20 and inside surfaces of the flanges 44. This again minimizes friction, and avoids metal to metal contact between the flanges 44 and the tilter roller shaft 60. The support block bushing 50, as used in the present invention, typically costs about half as much as the materials which carry out a similar function in the prior art.

After the shaft holes 48 and the bushing hole 22 are aligned, the non-knurled end of the tilter roller shaft 60 is inserted into one of the shaft holes 48. Through the application of an appropriate force, the knurl band 22 is press fit into a second one of the shaft holes 48. The set screw 12 is now screwed into the tapped hole 26 of the support block 20 so as to make contact with an outside portion of the support block bushing 50. As the set screw 12 presses against the circumference of the support block bushing 50, the support block bushing 50 flexes inward. Thus, a portion of the support block bushing 50 frictionally engages the tilter roller shaft 60 and interferes with further rotation. By loosening the set screw 12, the support block 20 and the center tilt mount 40 may once again rotate with respect to each other.

Figure 7:
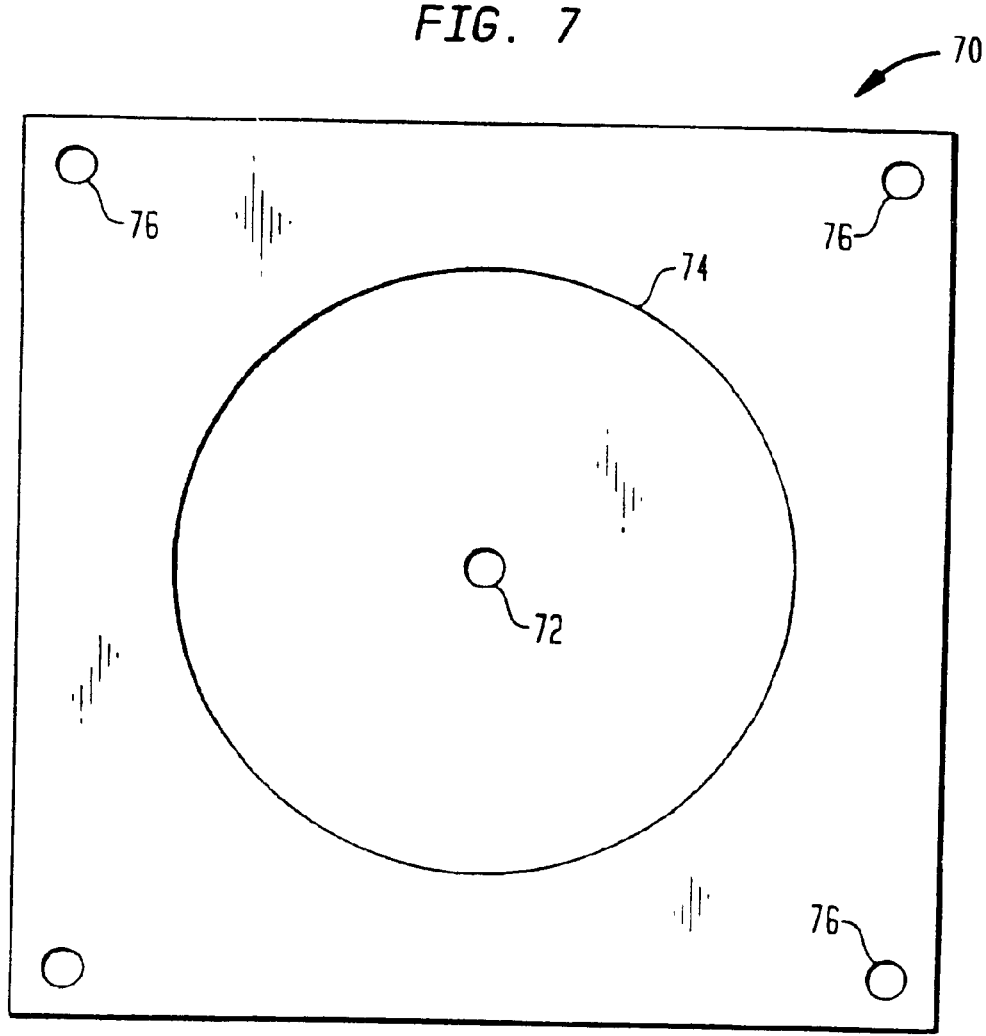
FIG. 7 is a front view of a rotating plate according to one embodiment of the invention.

FIG. 7 illustrates the rotating plate 70 which is rotatably secured to the center tilt mount 40 by the rivet 80. The axis of rotation of the rotating plate 70, as illustrated in FIG. 2, is perpendicular to the axis of rotation defined by the tilter roller shaft 60 around which the center tilt mount 40 rotates relative to the support block 20. The rotating plate 70 is generally square in shape and has a rivet hole 72 formed therethrough at the center. The rotating plate 70 also includes a recessed portion 74 disposed on a first surface thereof. The recessed portion 74, which is preferably circular in shape, allows the rivet 80 to protrude through the rivet hole 72 and not interfere with the adapter plate 90 which may be connected to the rotating plate 70. Four mounting holes 76 are disposed at the corners of the rotating plate 70. The mounting holes 76 are used to attach the rotating plate 70 to the adapter plate 90.

It should be understood that the rotating plate 70 is optional. In certain applications, for example, when it is desired that the mounted electronic device is not rotatable about the z-axis, the rotating plate 70 would not be included in the tilter 10, instead the adapter plate 90 would be directly mounted to the center tilt mount 40. An example of a device where rotation about the z-axis would not be desired is a keyboard 102 or a laptop computer 104 as shown in FIG. 1. It would be desirable to rotate these devices about the x and y-axis defined in FIG. 2, but it is unlikely that a user would require rotation about the z-axis.

Figure 8:
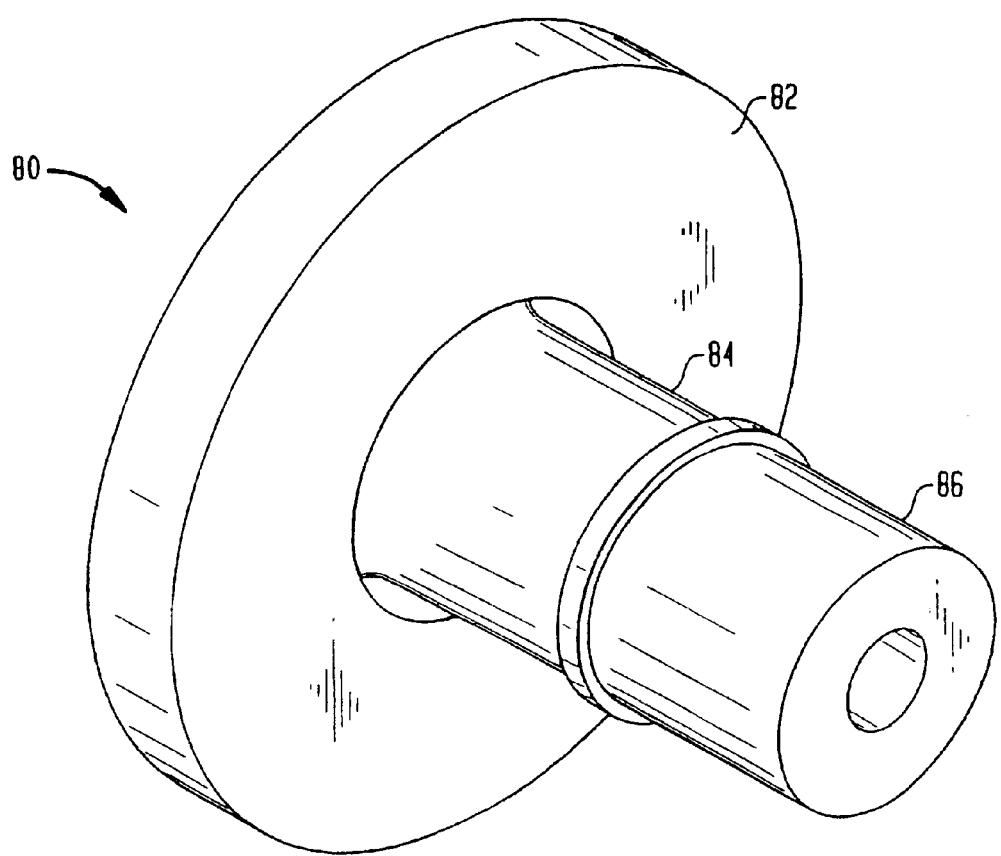
FIG. 8 is a perspective view of a rivet according to one embodiment of the invention.

The rivet 80 is preferably fabricated from a material that may be plastically deformed and is sufficiently malleable so as not to fracture during such deformation. As illustrated in FIG. 8, the rivet 80 has a head 82 that fits within the recessed portion 41 of the center tilt mount 40 and a first cylindrical portion 84 that has a diameter that corresponds to the diameter of the rivet holes 49 and 72. The length of the first cylindrical portion 84 is such that it may pass through the rivet holes 49 and 72. The rivet also includes a second cylindrical portion 86 having a smaller diameter than the first cylindrical portion 84. The second cylindrical portion 86 protrudes above the surface of the recessed portion 74.

A riveting machine is used to deform the second cylindrical portion 86 so that its diameter becomes larger than diameters of the rivet holes 49 and 72 causing the rotating plate 70 to be secured to the center tilt mount 40. Before attaching the rotating plate 70 to the center tilt mount 40, the washer 14 (FIG. 1) is placed in the shallow washer channel 47. The washer 14 serves to protect surfaces of the center tilt mount 40 during rotation of the rotating plate 70. The riveting machine may also determine the appropriate level of friction such that the rotating plate 70 is secured to the center tilt mount 40, while the rotating plate 70 remains capable of freely rotating about the axis of the rivet 80.

Figure 9A:
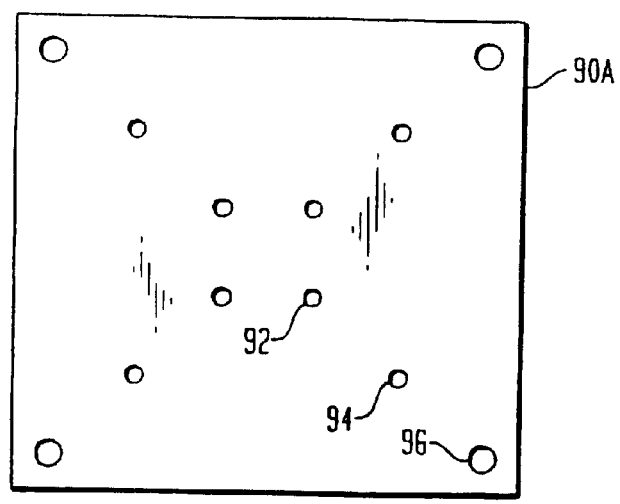
FIG. 9a is a front view of an adapter plate according to one embodiment of the invention.
Figure 9B:
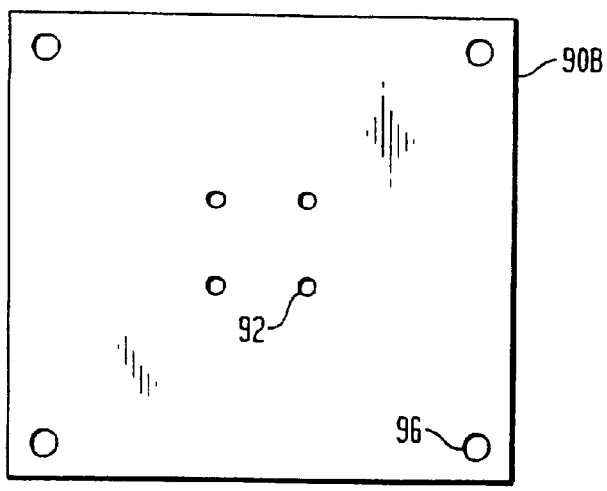
FIG. 9b is a front view of an adapter plate according to one embodiment of the invention.
Figure 9C:
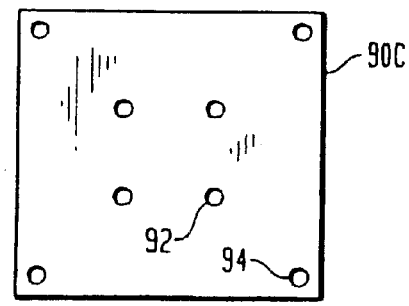
FIG. 9c is a front view of an adapter plate according to one embodiment of the invention.

FIGS. 9a–c illustrate three embodiments of the adapter plate 90. The adapter plate 90 is preferably fabricated from a strong material such as metal, and is preferably steel. All of the embodiments of the adapter plate 90 have holes 92 that are aligned with the mounting holes 45 and 76, so that the adapter plate can be mounted to either the center tilt mount 40 or the rotating plate 70. The adapter plate 90 is mounted to either the center tilt mount 40 or the rotating plate 70 by inserting a fastener, such as a screw or pin through the holes 92 and into either of the mounting holes 45 or 76. Preferably the mounting holes 45 and 76 are threaded and the fastener is a threaded fastener that can be screwed into the appropriate mounting holes 45 or 76.

The embodiment of the adapter plate 90a illustrated in FIG. 9a has fastening regions consisting of holes 94 and 96 that are positioned to correspond to two individually proposed VESA standards, a so-called large standard and a so-called small standard. Presently, VESA has not selected whether the so-called large standard or the so-called small standard is the final standard. The holes 94 are for the so-called small standard, and form the corners of a square having side lengths equal to 75 mm. The holes 96 are for the so-called large standard, and form the corners of a square having side lengths equal to 100 mm. Thus, no matter which standard is ultimately selected, the adapter plate 90a can be attached to a flat-screen device with threaded fasteners (not shown), or other means.

The embodiment of the adapter plate 90b illustrated in FIG. 9b has fastening regions consisting of holes 96 corresponding to only the so-called large standard. The embodiment of the adapter plate 90c illustrated in FIG. 9c has fastening regions consisting of holes 94 corresponding to only the so-called small standard. It is understood that the adapter plate 90 may also contain other holes that form other configurations and have other dimensions.

Although this invention has been illustrated by reference to specific embodiments, it will be apparent to those skilled in the art that various changes and modifications may be made that clearly fall within the scope of the invention. The invention is intended to be protected broadly within the spirit and scope of the amended claims.

What is claimed is:

1. A tilter for adjustably mounting a device to a support mount, said tilter comprising:
   a support block configured for pivotably engaging the support mount around a vertical first axis, said support block having a first opening therein;
   a shaft attached to said support block extending away from said support block along said vertical first axis, said shaft adapted for engagement with said support mount whereby said support block is pivotable around said vertical first axis;
   a center tilt mount coupled to and configured to pivotally engage said support block around a horizontal second axis, wherein the second axis is perpendicular to the first axis, said center tilt mount having a second opening aligned with said first opening in said support block;
   a bushing received within the aligned first and second openings;
   a tilter shaft received within said bushing so as to pivotably couple said center tilt mount to said support block;
   a set screw threadingly received within a portion of said support block, said set screw having an end portion adapted to engage said bushing in the aligned first and second openings, whereby said bushing frictionally engages said tilter shaft to prevent relative rotation between said center tilt mount and said support block; and
   an adapter plate coupled to said tilt mount and configured to attach to the device.

2. The tilter according to claim 1, further comprising a rotating plate configured to be secured to said adapter plate and to be rotatably secured to said center tilt mount so as to permit pivotal rotation of said adapter plate relative to said center tilt mount around a third axis, wherein the third axis is perpendicular to the second axis.

3. The tilter according to claim 2, wherein said rotating plate is rotatably secured to said center tilt mount by a rivet.

4. The tilter according to claim 2, wherein said rotating plate has a first plurality of holes formed therein and said adapter plate has a second plurality of holes formed therein that is aligned with said first plurality of holes, said aligned holes configured to receive a plurality of fasteners so as to secure said adapter plate to said rotating plate.

5. The tilter according to claim 1, wherein said center tilt mount has a first plurality of holes formed therein and said adapter plate has a second plurality of holes formed therein that is aligned with said first plurality of holes, said aligned holes configured to receive a plurality of fasteners so as to secure said adapter plate to said center tilt mount.

6. The tilter according to claim 1, wherein said tilter shaft has a knurl band located at one end.

7. The tilter according to claim 2, wherein said center tilt mount includes a groove formed on a surface thereof.

8. The tilter according to claim 7, further comprising a washer, said washer configured to be received in said groove on said center tilt mount so as to be interposed between said center tilt mount and said rotating plate.

9. The tilter according to claim 3, wherein said center tilt mount includes a groove formed on a surface thereof.

10. The tilter according to claim 9, wherein said rivet includes a head that contacts said center tilt mount within said groove.

11. The tilter according to claim 1, wherein said adapter plate includes four holes forming corners of a square having sides of approximately 100 millimeters.

12. The tilter according to claim 1, wherein said adapter plate includes four holes forming corners of a square having sides of approximately 75 millimeters.

13. The tilter according to claim 1, wherein said adapter plate includes a first set of four holes forming corners of a first square having sides of approximately 75 millimeters and a second set of four holes forming corners of a second square having sides of approximately 100 millimeters.

14. A tilter and device combination, said combination comprising a tilter according to claim 1 and a device attached to said adapter plate, wherein the device is a flat-screen television.

15. A tilter and device combination, said combination comprising a tilter according to claim 1 and a device attached to said adapter plate, wherein the device is a flat-screen computer monitor.

16. A tilter and device combination, said combination comprising a tilter according to claim 1 and a device attached to said adapter plate, wherein the device is a keyboard.

17. A tilter and device combination, said combination comprising a tilter according to claim 1 and a device attached to said adapter plate, wherein the device is a laptop computer.

18. A tilter for adjustably mounting a device to a support mount, said tilter comprising:
   a support block including a support shaft and a body, said support shaft disposed within one end of said body extending outwardly therefrom and having an axial centerline aligned with a first axis, said support shaft configured to pivotally rotate around the first axis, and said body having a body hole formed therein, said body hole having an axial centerline aligned with a second axis that is perpendicular to the first axis;
   a center tilt mount having a floor and sidewalls extending therefrom, each said sidewall having a sidewall hole formed therein, each said sidewall hole aligned with the other sidewall hole and said body hole, at least one stop member extending from said floor between said sidewalls;
   a tilter shaft coupled to said body hole and said sidewall holes so as to rotatably engage said support block and said center tilt mount so that said center tilt mount can pivotally rotate around the second axis, wherein said at least one stop member is adapted to arrest the rotation of said center tilter about said tilter shaft upon engagement with a portion of said support block; and
   means for connecting the device to said tilter.

19. The tilter of claim 18, wherein said means for connecting the device to said tilter is an adapter plate.

20. The tilter of claim 19, wherein said adapter plate includes a plurality of holes, said plurality of holes form at least one configuration adapted for mounting a device thereto.

21. The tilter of claim 19, wherein said adapter plate is connected to the device with fasteners.

22. The tilter of claim 21, wherein said fasteners are screws.

23. The tilter of claim 19, wherein said center tilt mount includes a plurality of mounting holes formed in said floor and said adapter plate includes a plurality of holes that align with said mounting holes.

24. The tilter of claim 21, wherein said adapter plate is connected to said center tilt mount with fasteners.

25. The tilter of claim 24, wherein said fasteners are screws.

26. The tilter of claim 18, further comprising a rotating plate coupled to said center tilt mount.

27. The tilter of claim 26, wherein said floor has a hole formed therein, said floor hole having an axial centerline aligned with a third axis that is perpendicular to the first axis and the second axis, said rotating plate having a hole formed therein that is aligned with said floor hole.

28. The tilter plate of claim 27, wherein said means for connecting said rotating plate and said center tilt mount is a rivet.

29. The tilter of claim 28, wherein said rivet is inserted through said floor hole and said rotating plate hole.

30. The tilter of claim 28, wherein said rivet includes a head and a shaft, said rivet being inserted through said floor hole and said rotating plate hole so that said rivet head contacts said floor and a portion of said rivet shaft protrudes above said rotating plate hole.

31. The tilter of claim 30, further comprising means for securing said shaft within said rotating plate hole.

32. The tilter of claim 30, wherein said portion of said rivet shaft protruding above said rotating plate hole is deformed, said deformed portion having a diameter larger than a diameter of said rotating plate hole so as to secure said rotating plate to said center tilt mount while allowing said rotating plate to rotate around said center tilt mount.

33. The tilter of claim 30, wherein said floor includes an indented region formed in a surface thereof, said indented region having a nearly identical shape and depth as said rivet head, and said rivet head contacts said center tilt mount within said indented region.

34. The tilter of claim 26, wherein said means for connecting the device to said tilter is an adapter plate.

35. The tilter of claim 34, wherein said rotating plate includes a plurality of mounting holes formed therein and said adapter plate includes a plurality of holes that align with said mounting holes.

36. The tilter of claim 34, wherein said adapter plate is connected to said center tilt mount with fasteners.

37. The tilter of claim 36, wherein said fasteners are screws.

38. The tilter according to claim 26, wherein said center tilt mount includes an indented region formed on a surface thereof and further comprising a washer configured to be received within said indented region so as to be interposed between said center tilt mount and said rotating plate.

39. The tilter according to claim 32, wherein said rotating plate includes an indented region and said deformed portion of said rivet shaft contacts said rotating plate within said indented region.

40. The tilter according to claim 18, wherein said tilter shaft includes a knurl band insertable into one said sidewall hole so as to form a press fit therebetween.

41. The tilter according to claim 18, further comprising a bushing, wherein said tilter shaft is disposed within said bushing and said bushing is disposed through said body hole and said sidewall holes.

42. The tilter according to claim 41, wherein said body includes a threaded hole therein, said threaded hole in communication with said body hole and configured to receive a set screw, said set screw configured to engage said bushing so as to deform said bushing, said deformed bushing frictionally engaging said tilter shaft so as to prevent rotation thereabout.

43. The tilter according to claim 18, wherein said support shaft includes a knurl band located on a surface thereof, said knurl band forming a press fit between said support shaft and said body.

44. A tilter for adjustably mounting a device to a support mount, said tilter comprising:
   a support block configured for pivotably engaging the support-mount around a first axis;
   a center tilt mount coupled to and configured to pivotally engage said support block around a second axis, wherein the second axis is perpendicular to the first axis;
   an adapter plate coupled to said tilt mount and configured to attach to the device; and
   a rotating plate configured to be secured to said adapter plate and to be rotatably secured to said center tilt mount so as to permit pivotal rotation of said adapter plate relative to said center tilt mount around a third axis, wherein the third axis is perpendicular to the second axis, wherein said rotating plate has a first plurality of holes formed therein and said adapter plate has a second plurality of holes formed therein that is aligned with said first plurality of holes, said aligned holes configured to receive a plurality of fasteners so as to secure said adapter plate to said rotating plate.

45. A tilter for adjustably mounting a device to a support mount, said tilter comprising:
   a support block configured for pivotably engaging the support mount around a first axis;
   a center tilt mount coupled to and configured to pivotally engage said support block around a second axis, wherein the second axis is perpendicular to the first axis, wherein said center tilt mount includes a first opening formed therein, and said support block has a second opening formed therein that aligns with said first opening;
   an adapter plate coupled to said tilt mount and configured to attach to the device;
   a tilter shaft configured to fit within said aligned openings of said center tilt mount and said support block so as to pivotably secure said center tilt mount to said support block; and
   a bushing configured to receive said tilter shaft therethrough and configured to be received in said opening of said support block, wherein said support block has a threaded hole therein for receiving a set screw, said set screw configured to engage said bushing in said opening of said support block so as to deform said bushing, said deformed bushing frictionally engaging said tilter shaft so as to prevent relative rotation therebetween.

46. A tilter for adjustably mounting a device to a support mount, said tilter comprising:
   a support block configured for pivotably engaging the support mount around a first axis;
   a center tilt mount coupled to and configured to pivotally engage said support block around a second axis, wherein the second axis is perpendicular to the first axis, wherein said center tilt mount includes a groove formed on a surface thereof;
   an adapter plate coupled to said tilt mount and configured to attach to the device;
   a rotating plate configured to be secured to said adapter plate and to be rotatably secured to said center tilt mount so as to permit pivotal rotation of said adapter plate relative to said center tilt mount around a third axis, wherein the third axis is perpendicular to the second axis; and
   a washer, said washer configured to be received in said groove on said center tilt mount so as to be interposed between said center tilt mount and said rotating plate.

47. A tilter for adjustably mounting a device to a support mount, said tilter comprising:

a support block configured for pivotably engaging the support mount around a first axis;

a center tilt mount coupled to and configured to pivotally engage said support block around a second axis, wherein the second axis is perpendicular to the first axis, wherein said center tilt mount includes a groove formed on a surface thereon;

an adapter plate coupled to said tilt mount and configured to attach to the device; and a rotating plate configured to be secured to said adapter plate and to be rotatably secured to said center tilt mount so as to permit pivotal rotation of said adapter plate relative to said center tilt mount around a third axis, wherein the third axis is perpendicular to the second axis, wherein said rotating plate is rotatably secured to said center tilt mount by a rivet, wherein said rivet includes a head that contacts said center tilt mount within said groove.

48. A tilter for adjustably mounting a device to a support mount, said tilter comprising:

a support block configured to engage the support mount around a first axis;

a center tilt mount coupled to and configured to pivotally engage said support block around a second axis, wherein the second axis is perpendicular to the first axis; and an adapter plate coupled to said tilt mount and configured to attach to the device, wherein said adapter plate includes a first set of four holes forming corners of a first square having sides of approximately 75 millimeters and a second set of four holes forming corners of a second square having sides of approximately 100 millimeters.

49. A tilter for adjustably mounting a device to a support mount, said tilter comprising:

a support block including a shaft and a body, said support shaft disposed within one end of said body having an axial centerline aligned with a first axis, said support shaft configured to pivotally rotate around the first axis, and said body having a body hole formed therein, said body hole having an axial centerline aligned with a second axis that is perpendicular to the first axis;

a center tilt mount having a floor and sidewalls extending therefrom, each said sidewall having a sidewall hole formed therein, each said sidewall hole aligned with the other sidewall hole and said body hole, wherein said floor has a floor hole formed therein, said floor hole having an axial centerline aligned with a third axis that is perpendicular to the first axis and the second axis;

a tilter shaft coupled to said body hole and said sidewall holes 60 as to rotatably engage said support block and said center tilt mount so that said center tilt mount can pivotally rotate around the second axis;

means for connecting the device to said tilter;

a rotating plate having a hole formed therein that is aligned with said floor hole; and a rivet coupling said rotating plate to said center tilt mount.

50. A tilter for adjustably mounting a device to a support mount, said tilter comprising:

a support block including a shaft and a body, said support shaft disposed within one end of said body having an axial centerline aligned with a first axis, said support shaft configured to pivotally rotate around the first axis, and said body having a body hole formed therein, said body hole having an axial centerline aligned with a second axis that is perpendicular to the first axis;

a center tilt mount having a floor and sidewalls extending therefrom, each said sidewall having a hole formed therein, each said sidewall hole aligned with said other sidewall holes and said body hole;

a tilter shaft coupled to said body hole and said sidewall holes so as to rotatably engage said support block and said center tilt mount so that said center tilt mount can pivotally rotate around the second axis;

an adapter plate for connecting the device to said tilter; and a rotating plate coupled to said center tilt mount, wherein said rotating plate includes a plurality of mounting holes formed therein and said adapter plate includes a plurality of holes that align with said mounting holes.

51. A tilter for adjustably mounting a device to a support mount, said tilter comprising:

a support block including a shaft and a body, said support shaft disposed within one end of said body having an axial centerline aligned with a first axis, said support shaft configured to pivotally rotate around the first axis, and said body having a body hole formed therein, said body hole having an axial centerline aligned with a second axis that is perpendicular to the first axis;

a center tilt mount having a floor and sidewalls extending therefrom, each said sidewall having a sidewall hole formed therein, each said sidewall hole aligned with the other sidewall hole and said body hole;

a tilter shaft coupled to said body hole and said sidewall holes so as to rotatably engage said support block and said center tilt mount so that said center tilt mount can pivotally rotate around the second axis;

means for connecting the device to said tilter; and a bushing, wherein said tilter shaft is disposed within said bushing and said bushing is disposed through said body hole and said sidewall holes, wherein said body includes a threaded hole therein, said threaded hole in communication with said body hole and configured to receive a set screw, said set screw configured to engage said bushing so as to deform said bushing, said deformed bushing frictionally engaging said tilter shaft so as to prevent rotation thereabout.

52. A tilter for adjustably mounting a device to a support mount, said tilter comprising:

a support block configured for pivotably engaging the support mount around a first axis, said support block having a threaded opening therein;

a center tilt mount pivotally coupled to said support block around a second axis, wherein the second axis is perpendicular to the first axis, said center tilt mount including a first opening formed therein and said support block including a second opening formed therein aligned with said first opening;

an adapter plate coupled to said tilt mount and adapted for attaching a device thereto;

a bushing received within said aligned openings of said center tilt mount and said support block;

a tilter shaft received within said bushing pivotably securing said center tilt mount to said support block; and a set screw threadingly received within said threaded opening, said set screw configured to force said bushing into frictional engagement with said tilter shaft to prevent rotation of said tilter shaft relative to said support mount.

53. The tilter of claim 18, further including another stop member extending from said floor between said sidewalls.

54. The tilter of claim 53, wherein said stop members are arranged adjacent said sidewalls.

55. The tilter of claim 18, wherein said at least one stop member arrests said rotation in a negative direction about an x-axis of said tilter shaft.

56. A tilter for adjustably mounting a device to a support mount, said tilter comprising:

a support block configured to engage the support mount around a first axis;

a center tilt mount pivotally coupled to said support block around a second axis, wherein the second axis is perpendicular to the first axis;

an adapter plate coupled to said tilt mount and adapted for attaching a device thereto; and at least one stop member extending from said center tilt mount opposing said support block, wherein said at least one stop member is adapted to arrest the rotation of said center tilter about said tilter shaft upon engagement with a portion of said support block.

57. The tilter of claim 56, further including another stop member extending from said center tilt mount and spaced from the other stop member.

\* \* \* \* \*

UNITED STATES PATENT AND TRADEMARK OFFICE
CERTIFICATE OF CORRECTION

PATENT NO. : 6,505,988 B1
DATED : January 14, 2003
INVENTOR(S) : Odd N. Oddsen, Jr.

It is certified that error appears in the above-identified patent and that said Letters Patent is hereby corrected as shown below:

Column 1,
Line 26, "set-forth" should read -- set forth --.

Column 3,
Line 60, "Illustrated" should read -- illustrated --.

Column 8,
Line 66, "21" should read -- 19 --.

Column 10,
Line 4, "support-mount" should read -- support mount --.

Column 11,
Line 54, "60" should read -- so --.

Signed and Sealed this

Eighth Day of July, 2003

JAMES E. ROGAN
*Director of the United States Patent and Trademark Office*

US006505988C1

(12) EX PARTE REEXAMINATION CERTIFICATE (6690th)
United States Patent
Oddsen, Jr.

(10) Number: US 6,505,988 C1
(45) Certificate Issued: Mar. 3, 2009

(54) TILTER FOR POSITIONING ELECTRONIC DEVICES

(75) Inventor: Odd N. Oddsen, Jr., Easton, PA (US)

(73) Assignee: Innovative Office Products, Inc., Easton, PA (US)

Reexamination Request:
No. 90/008,747, Jul. 3, 2007

Reexamination Certificate for:
Patent No.: 6,505,988
Issued: Jan. 14, 2003
Appl. No.: 09/406,530
Filed: Sep. 27, 1999

Certificate of Correction issued Jul. 8, 2003.

Related U.S. Application Data

(60) Provisional application No. 60/137,088, filed on Jun. 2, 1999.

(51) Int. Cl.
*E04G 3/00* (2006.01)

(52) U.S. Cl. ............... 403/110; 248/278.1; 248/918; 248/921; 403/84

(58) Field of Classification Search .............. None
See application file for complete search history.

(56) References Cited

U.S. PATENT DOCUMENTS

| 318,986 | A | 6/1885 | Hicks |
| 2,432,860 | A | 12/1947 | Clatfelter |
| 4,034,946 | A | 7/1977 | Zimmer, Jr. |
| 4,687,167 | A | 8/1987 | Skalka et al. |
| 5,617,680 | A | 4/1997 | Beatty |
| 5,842,672 | A | 12/1998 | Sweere et al. |
| 6,505,988 | B1 | 1/2003 | Oddsen, Jr. |

*Primary Examiner*—Joseph A. Kaufman

(57) ABSTRACT

A tilter for positioning electronic devices such as flat-screen monitors. The tilter includes a support block pivotally attached to a center tilt mount, and a shaft that is capable of engaging an extension arm or other components that attach to a support block. A rotating plate is rotatably secured to the center tilt mount. An adapter plate that is capable of securing the tilter to a variety of standardized fastening regions is secured to either the rotating plate or the center tilt mount. The tilter allows for the rotational positioning of an electronic device about one or more axis.

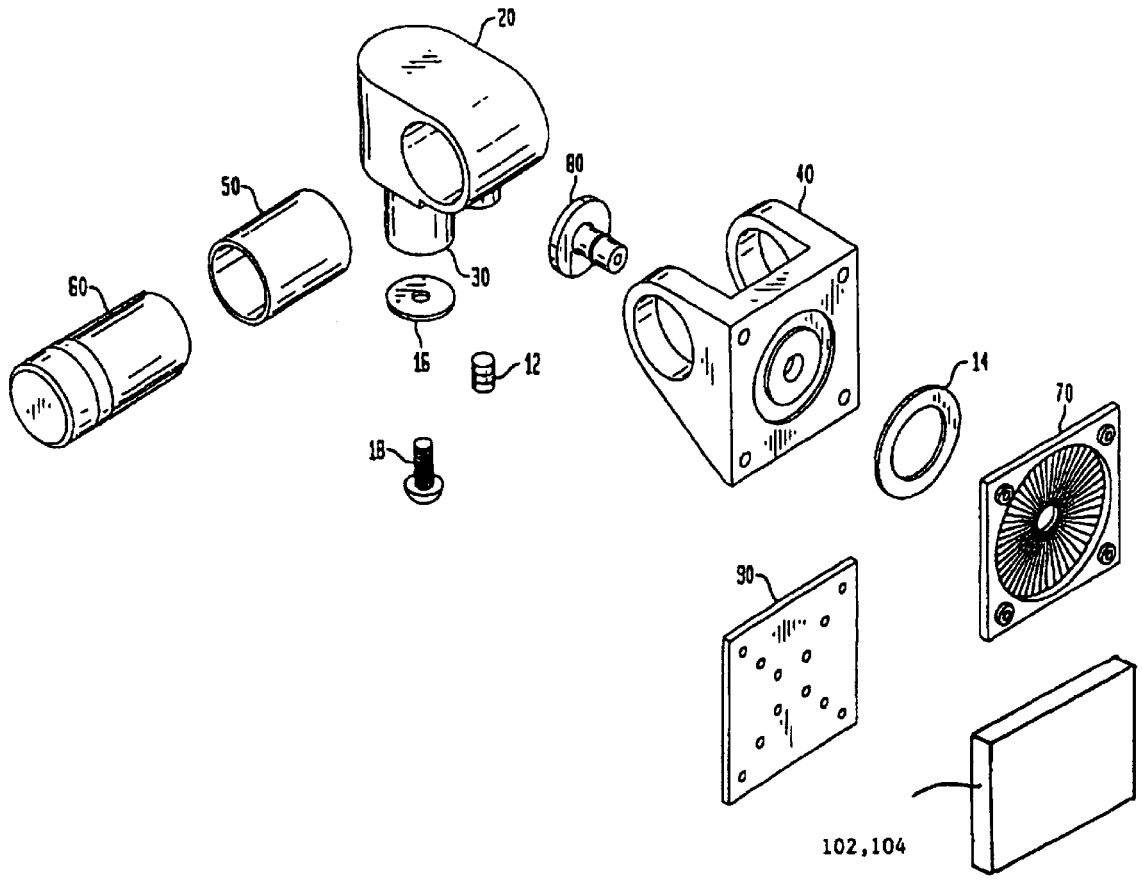

US 6,505,988 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4, 6, 11–17, 44, 45 and 50–52 is confirmed.

Claims 48 and 49 are determined to be patentable as amended.

New claims 58–68 are added and determined to be patentable.

Claims 5, 7–10, 18–43, 46, 47 and 53–57 were not reexamined.

48. A tilter for adjustably mounting a device to a support mount, said tilter comprising:
a support block configured to engage the support mount around a first axis;
a center tilt mount coupled to and configured to pivotally engage said support block around a second axis, wherein the second axis is perpendicular to the first axis; and
an adapter plate coupled to said tilt mount and configured to attach to the device, wherein said adapter plate includes a first set of four holes forming corners of a first square having sides of approximately 75 millimeters and a second set of four holes forming corners of a second square having sides of approximately 100 millimeters, *wherein said center tilt mount further comprises spaced apart sidewalls between which at least a portion of said support block is configured to fit.*

49. A tilter for adjustably mounting a device to a support mount, said tilter comprising:
a support block including a shaft and a body, said support shaft disposed within one end of said body having an axial centerline aligned with a first axis, said support shaft configured to pivotally rotate around the first axis, and said body having a body hole formed therin, said body hole having an axial centerline aligned with a second axis that is perpendicular to the first axis;
a center tilt mount having a floor and sidewalls extending therefrom, *wherein said sidewalls are spaced apart such that at least a portion of said support block may fit therebetween*, each said sidewall having a sidewall hole formed therein, each said sidewall hole alinged with the other sidewall hole and said body hole, wherein said floor has a floor hole formed therein, said floor hole having an axial centerline aligned with a third axis that is perpendicular to the first axis and the second axis;
a tilter shaft coupled to said body hole and said sidewall holes so as to rotatably engage said support block and said center tilt mount so that said center tilt mount can pivotally rotate around the second axis;
means for connecting the device to said tilter;
a rotating plate having a hole formed therein that is aligned with said floor hole; and
a rivet coupling said rotating plate to said center tilt mount.

*58. The tilter of claims 1, 44, 45, or 52, wherein said center tilt mount further comprises spaced apart sidewalls between which at least a portion of said support block is configured to fit.*

*59. The tilter of claim 50 or 51, wherein said sidewalls are spaced apart such that at least a portion of said support block may fit therebetween.*

*60. The tilter of claim 1, wherein said tilter shaft is rotationally fixed with respect to said center tilt mount.*

*61. The tilter of claim 6, wherein said knurl band is configured to rotationally fix said tilter shaft with respect to said center tilt mount.*

*62. The tilter of claims 45, 49, 50, 51, or 52, wherein said tilter shaft is rotationally fixed with respect to said center tilt mount.*

*63. The tilter of claim 62, wherein said tilter shaft further includes a knurl band, whereby said tilter shaft may be rotationally fixed with respect to said center tilt mount.*

*64. The tilter of claim 44 or 48 further comprising a tilter shaft rotationally fixed with respect to said center tilt mount.*

*65. The tilter of claim 64, wherein said tilter shaft further includes a knurl band, whereby said tilter shaft may be rotationally fixed with respect to said center tilt mount.*

*66. The tilter of claim 64, wherein said support block has an opening therein, said tilter further including a bushing configured to receive said tilter shaft and configured to be received in said opening of said support block, wherein said support block has a threaded hole therein for receiving a set screw, said set screw configured to engage said bushing in said opening of said support block so as to deform said bushing, said deformed bushing frictionally engaging said tilter shaft so as to prevent relative rotation between said center tilt mount and said support block.*

*67. The tilter of claim 50 further including a bushing configured to receive said tilter shaft and configured to be received in said body hole of said support block, wherein said support block has a threaded hole therein for receiving a set screw, said set screw configured to engage said bushing in said body hole of said support block so as to deform said bushing, said deformed bushing frictionally engaging said tilter shaft so as to prevent relative rotation between said center tilt mount and said support block.*

*68. A tilter for adjustably mounting a device to a support mount, said tilter comprising:*
*a support block including a shaft and a body, said support shaft disposed within one end of said body having an axial centerline aligned with a first axis, said support shaft configured to pivotally rotate around the first axis, and said body having a body hole formed therein, said body hole having an axial centerline aligned with a second axis that is perpendicular to the first axis;*
*a center tilt mount having a floor and sidewalls extending therefrom, each said sidewall having a sidewall hole formed therein, each said sidewall hole aligned with the other sidewall hole and said body hole, wherein said floor has a floor hole formed therein, said floor hole having an axial centerline aligned with a third axis that is perpendicular to the first axis and the second axis;*
*a tilter shaft coupled to said body hole and said sidewall holes so as to rotatably engage said support block and said center tilt mount so that said center tilt mount can pivotally rotate around the second axis;* means for connecting the device to said tilter;

a rotating plate having a hole formed therein that is aligned with said floor hole;

a rivet coupling said rotating plate to said center tilt mount, and a bushing configured to receive said tilter shaft and configured to be received in said body hole of said support block, wherein said support block has a threaded hole therein for receiving a set screw, said set screw configured to engage said bushing in said body hole of said support block so as to deform said bushing, said deformed bushing frictionally engaging said tilter shaft so as to prevent relative rotation between said center tilt mount and said support block.

\* \* \* \* \*